(12) United States Patent
Kim

(10) Patent No.: US 12,276,311 B2
(45) Date of Patent: Apr. 15, 2025

(54) PAD LINER FOR BRAKE APPARATUS

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 370 days.

(21) Appl. No.: 17/869,125

(22) Filed: Jul. 20, 2022

(65) Prior Publication Data
US 2023/0204081 A1    Jun. 29, 2023

(30) Foreign Application Priority Data
Dec. 29, 2021    (KR) .................. 10-2021-0191536

(51) Int. Cl.
*F16D 65/097*    (2006.01)
(52) U.S. Cl.
CPC .................. *F16D 65/0972* (2013.01)
(58) Field of Classification Search
CPC .. F16D 55/227; F16D 65/097; F16D 65/0972; F16D 65/0974; F16D 65/0977; F16D 2055/007; F16D 2055/0029
See application file for complete search history.

(56) References Cited

U.S. PATENT DOCUMENTS

| | | | | |
|---|---|---|---|---|
| 6,910,555 B2* | 6/2005 | Ciotti | ................ | F16D 55/228 188/71.3 |
| 10,316,912 B2* | 6/2019 | Crippa | ................ | F16D 65/0977 |
| 10,816,053 B2* | 10/2020 | Yokoyama | .......... | F16D 65/0971 |
| 10,914,351 B2* | 2/2021 | Furukawa | ........... | F16D 65/0973 |
| 11,680,614 B2* | 6/2023 | Kim | .................... | F16D 65/0977 188/72.3 |
| 11,892,044 B2* | 2/2024 | Kim | .................... | F16D 65/0087 |
| 11,946,519 B2* | 4/2024 | Sato | ..................... | F16D 65/095 |
| 2003/0178261 A1* | 9/2003 | Ciotti | .................... | F16D 55/228 188/73.31 |
| 2007/0278049 A1* | 12/2007 | Kobayashi | ............ | F16D 55/228 188/73.39 |
| 2013/0256068 A1* | 10/2013 | Hazeki | .................. | F16D 55/226 188/72.4 |
| 2017/0037916 A1* | 2/2017 | Crippa | ................ | F16D 55/2265 |
| 2019/0178320 A1* | 6/2019 | Yokoyama | ............ | F16D 55/226 |

(Continued)

FOREIGN PATENT DOCUMENTS

KR    10-2019-0021566 A    3/2019

*Primary Examiner* — Thomas W Irvin
(74) *Attorney, Agent, or Firm* — NovoTechIP International PLLC

(57) ABSTRACT

A pad liner for a brake apparatus according to the present disclosure includes a pad liner body disposed between a pair of pin members, a pair of pad liner supports extended and formed from both ends of the pad liner body, respectively, and configured to support a pair of pin members, respectively, a pad liner return part connected to the pad liner body and configured to pressurize a first brake pad, come into contact with the first brake pad, and restore the first brake pad to its original state by providing an elastic restoring force thereof upon release of braking, and a pad liner extension part connected to the pad liner body, configured to come into contact with a second brake pad and pressurize the second brake pad, and disposed on a side lower than the pad liner return part.

9 Claims, 12 Drawing Sheets

(56) References Cited

U.S. PATENT DOCUMENTS

2019/0257377 A1\* 8/2019 Furukawa ............. F16D 65/095
2021/0254679 A1\* 8/2021 Kim .................... F16D 65/0972
2022/0042563 A1\* 2/2022 Sato ..................... F16D 65/092
2022/0065311 A1\* 3/2022 Kim .................... F16D 65/0972

\* cited by examiner

PAD LINER FOR BRAKE APPARATUS

CROSS-REFERENCE TO RELATED APPLICATIONS

This application claims the benefit under 35 U.S.C. § 119(a) of priority to Korean Patent Application No. 10-2021-0191536 filed on Dec. 29, 2021 in the Korean Intellectual Property Office, the entire disclosure of which is incorporated herein by reference for all purposes.

BACKGROUND

1. Technical Field

Exemplary embodiments of the present disclosure relate to a pad liner for a brake apparatus, and more particularly, to a pad liner for a brake apparatus, which can prevent the occurrence of drag torque and rattle noise.

2. Discussion of Related Art

In general, a brake pad of a brake apparatus for braking provides braking power through a contact with a brake disk, and includes a plurality of parts.

A brake apparatus having a mono body type has a structure in which a pair of brake pads is mounted on a pin and disposed on both sides of a brake disk. A pad liner is coupled with the pin and pressurizes the pair of brake pads. In this case, as one of the pair of brake pads moves, that is, slides, the pair of brake pads comes into contact with the brake disk or is spaced apart from the brake disk. However, since the pad liner pressurizes the pair of brake pads, there is a problem in that drag torque occurs because the brake pads do not properly slide. Furthermore, there is a problem in that rattle noise occurs when a pressurization force of the pad liner to pressurize the pair of brake pads is weakened.

The background technology of the present disclosure is disclosed in Korean Patent Application Publication No. 10-2019-0021566 published on Mar. 6, 2019 and entitled "PAD LINER FOR CALIPER."

SUMMARY

Various embodiments are directed to providing a pad liner for a brake apparatus, which can prevent the occurrence of drag torque and rattle noise.

In an embodiment, a pad liner for a brake apparatus includes a pad liner body disposed between a pair of pin members, a pair of pad liner supports extended and formed from both ends of the pad liner body, respectively, and configured to support a pair of pin members, respectively, a pad liner return part connected to the pad liner body and configured to pressurize a first brake pad, come into contact with the first brake pad, and restore the first brake pad to its original state by providing an elastic restoring force thereof upon release of braking, and a pad liner extension part connected to the pad liner body, configured to come into contact with a second brake pad and pressurize the second brake pad, and disposed on a side lower than the pad liner return part.

Furthermore, the pad liner return part is longer than the pad liner extension part.

Furthermore, the pad liner return part includes a first pad liner return part extended and formed from the pad liner body to one side thereof and disposed on a side higher than the pad liner extension part, and a pair of second pad liner return parts spaced apart from each other, extended and formed from the first pad liner return part to one side thereof and configured to come into contact with the first brake pad and pressurize the first brake pad.

Furthermore, the first pad liner return part is elastically deformed and inclined at a given angle when coming into contact with a first back plate of the first brake pad.

Furthermore, the pad liner extension part includes a first pad liner extension part extended and formed from the pad liner body to the other side thereof and disposed on a side lower than the first pad liner return part, and a pair of second pad liner extension parts spaced apart from each other, extended and formed from the first pad liner extension part to the other side thereof, and configured to come into contact with the second brake pad and pressurize the second brake pad.

Furthermore, the pad liner extension part is elastically deformed and inclined at a given angle when coming into contact with a second back plate of the second brake pad.

Furthermore, a width of the second pad liner extension part is greater than a width of the second pad liner return part.

Furthermore, the pad liner further includes a pad liner coupling part bent and extended from the second pad liner extension part to a caliper body and fit into a coupling groove part of the caliper body by an elastic force thereof.

Furthermore, the coupling groove part has a width gradually reduced from the outside to the inside thereof on the caliper body.

Furthermore, the pad liner coupling part includes a first pad liner coupling part bent and extended from the second pad liner extension part to the caliper body, and a second pad liner coupling part extended from the first pad liner coupling part and bent and formed in a way to face the first pad liner coupling part.

The pad liner for a brake apparatus according to the present disclosure has an effect in that the occurrence of drag torque and rattle noise is prevented because the location of the second brake pad is firmly fixed and the first brake pad smoothly slides upon braking and release of braking as the pad liner extension part that pressurizes the second brake pad is disposed below the pad liner return part that pressurizes the first brake pad.

Furthermore, the present disclosure has an effect in that the location of the second pad liner return part is further fixed because, the pad liner extension part further assigns weight to the second brake pad as the pad liner extension part includes the pad liner coupling part fit into the caliper body.

DETAILED DESCRIPTION

Figure 1:
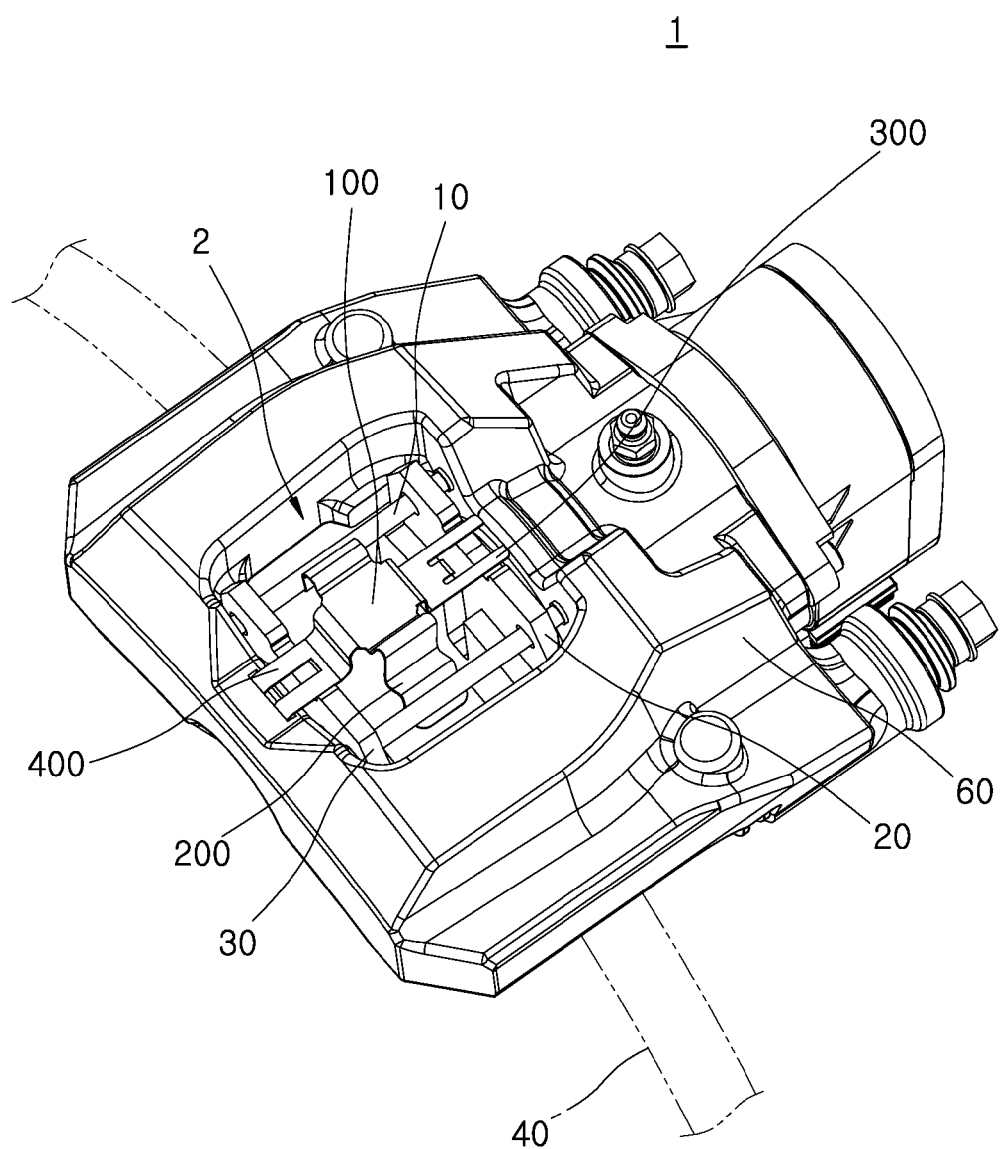
FIG. 1 is a perspective view of a brake apparatus for a vehicle according to an embodiment of the present disclosure.

Hereinafter, a pad liner for a brake apparatus will be described with reference to the accompanying drawings through various exemplary embodiments.

In such a process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 2:
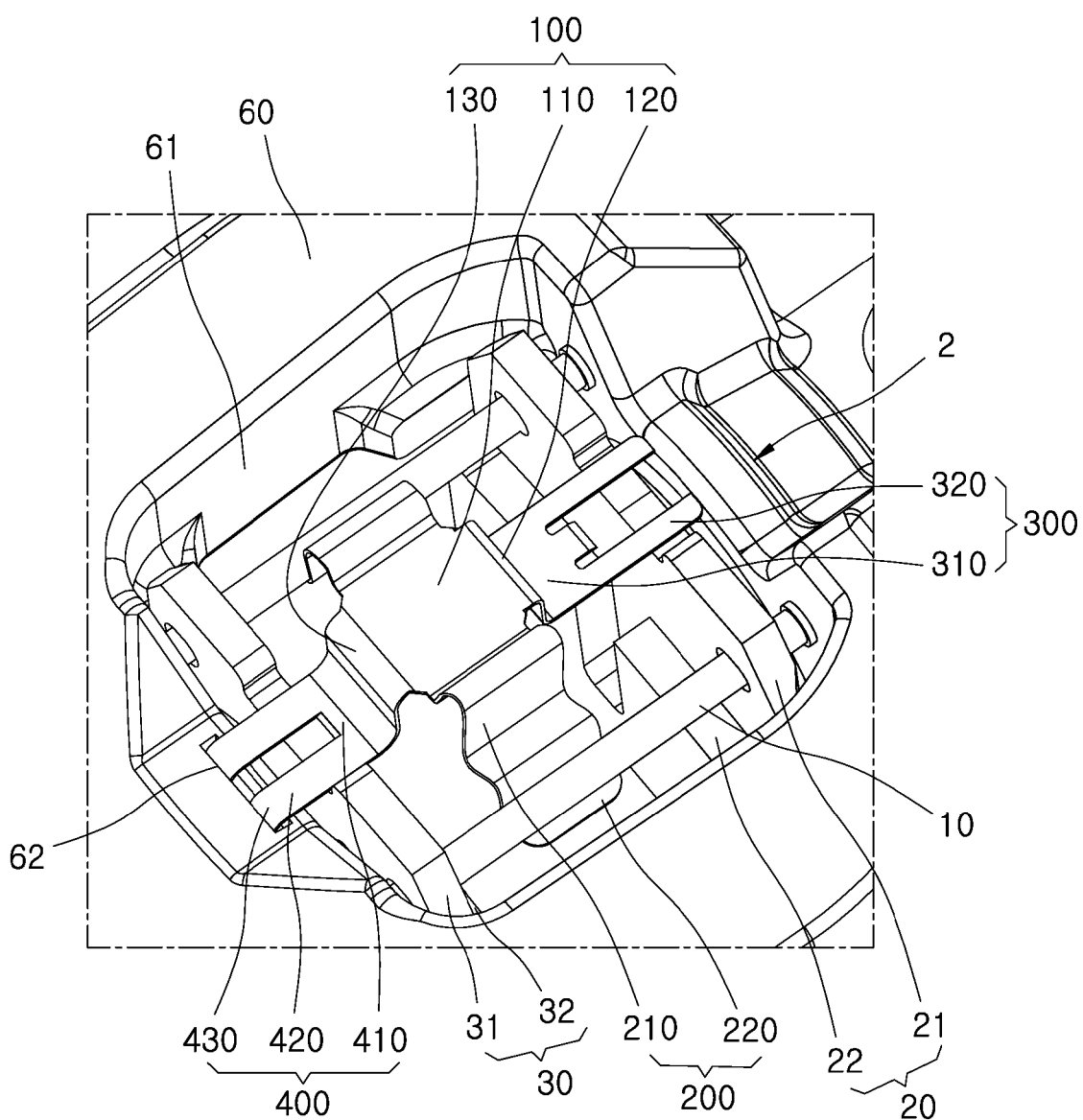
FIG. 2 is an enlarged view of FIG. 1.
Figure 3:
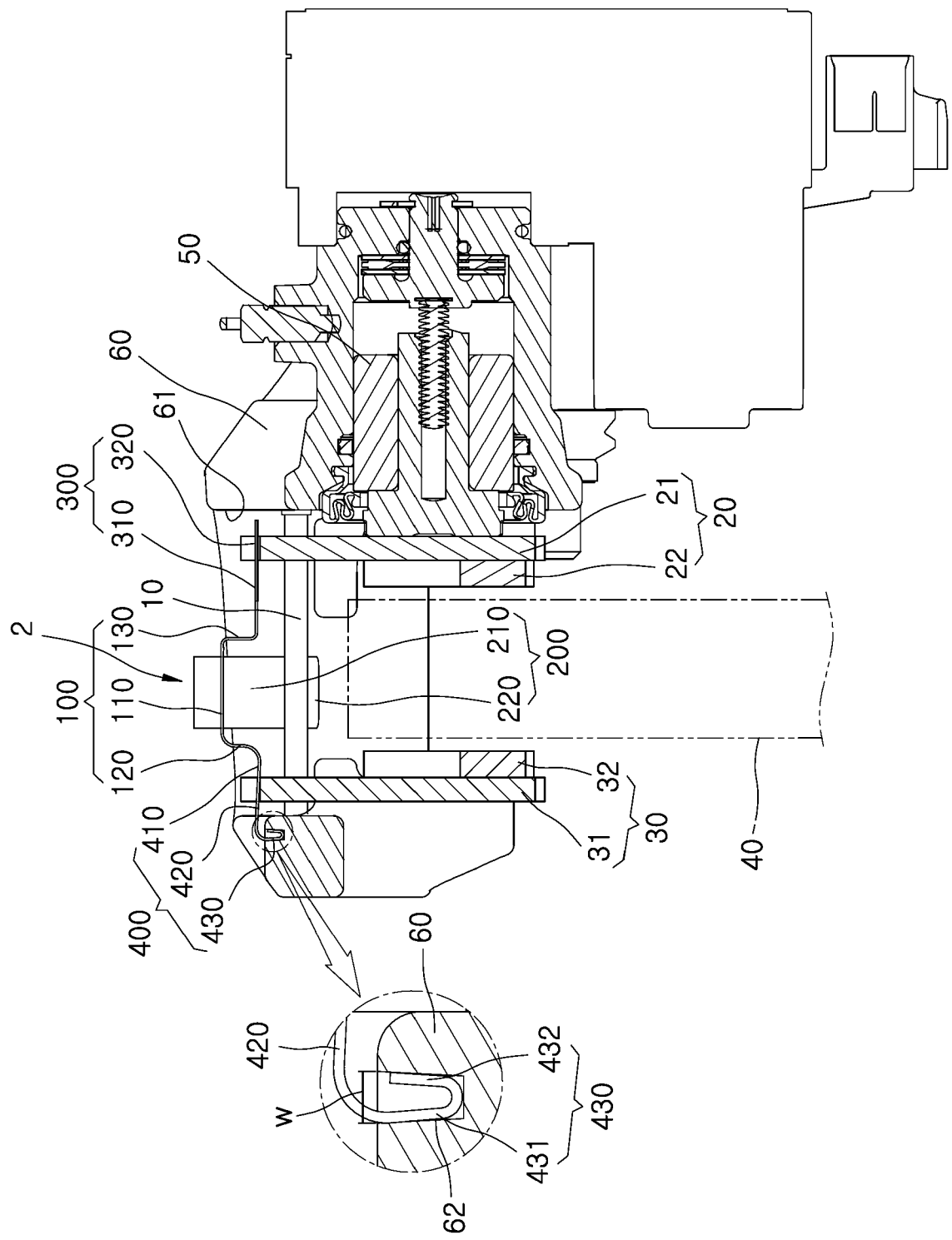
FIG. 3 is a cross-sectional view of FIG. 1.
Figure 4:
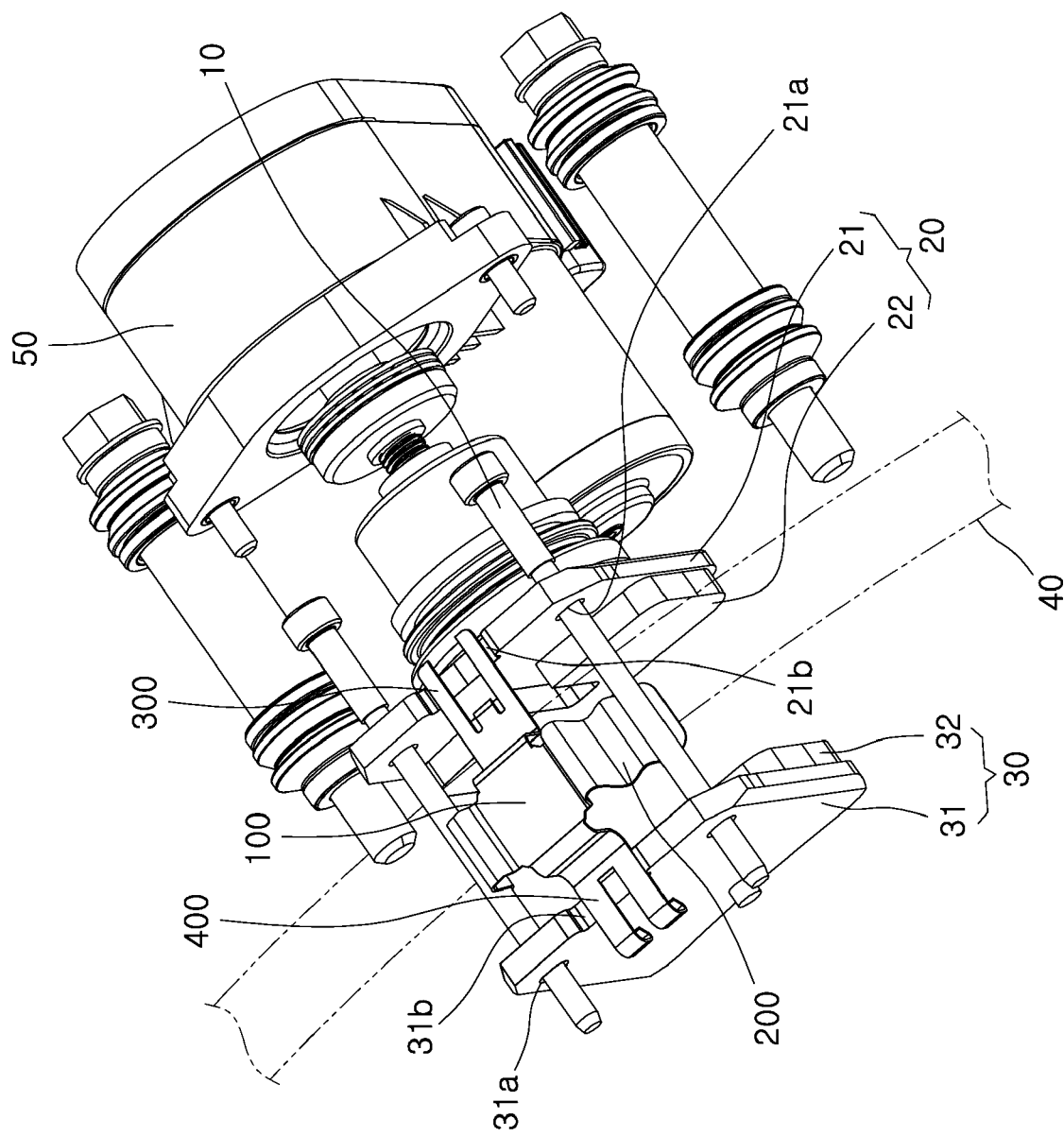
FIG. 4 is a perspective view of major parts of the brake apparatus for a vehicle according to an embodiment of the present disclosure.
Figure 5:
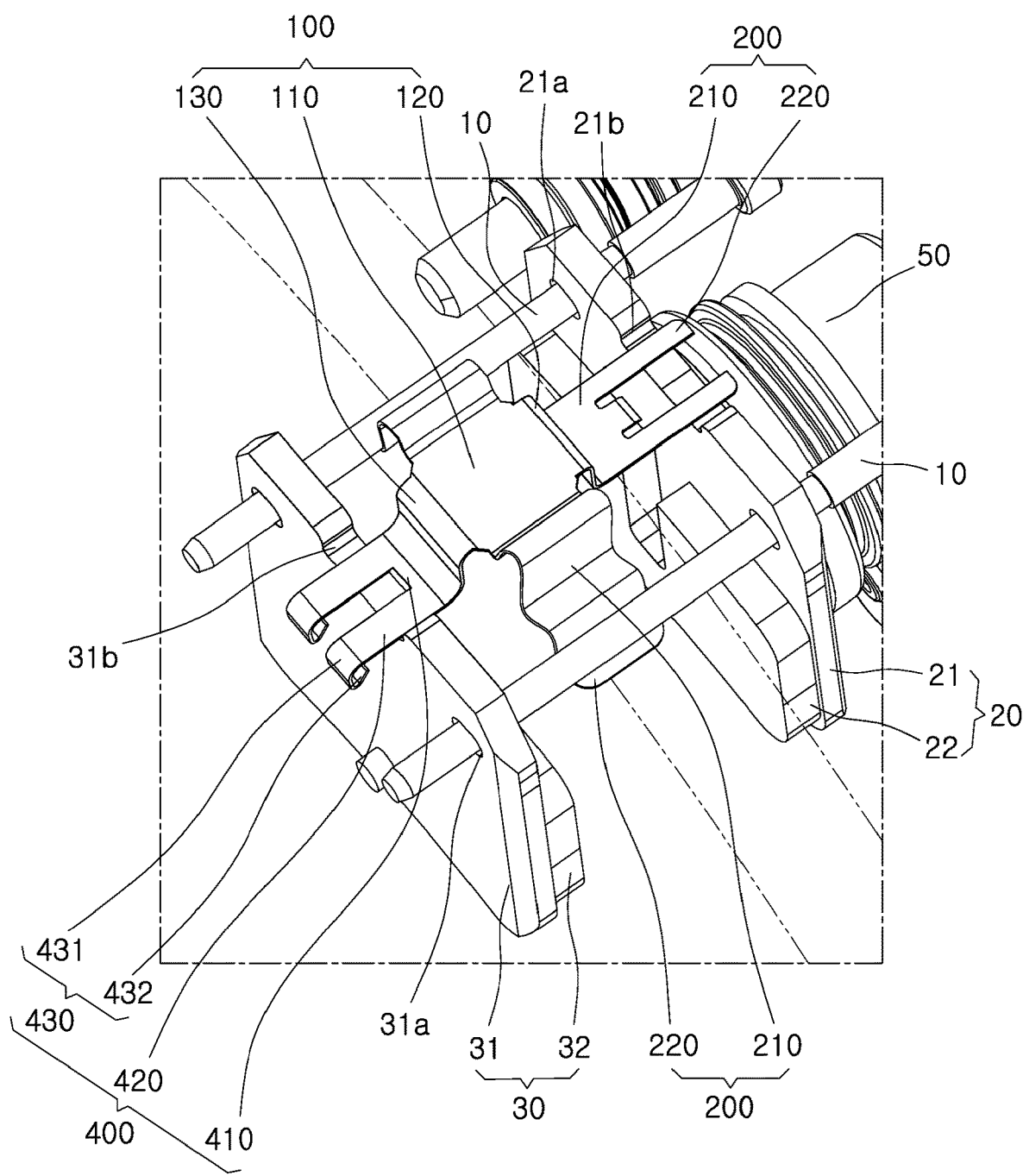
FIG. 5 is an enlarged view of FIG. 4.
Figure 6:
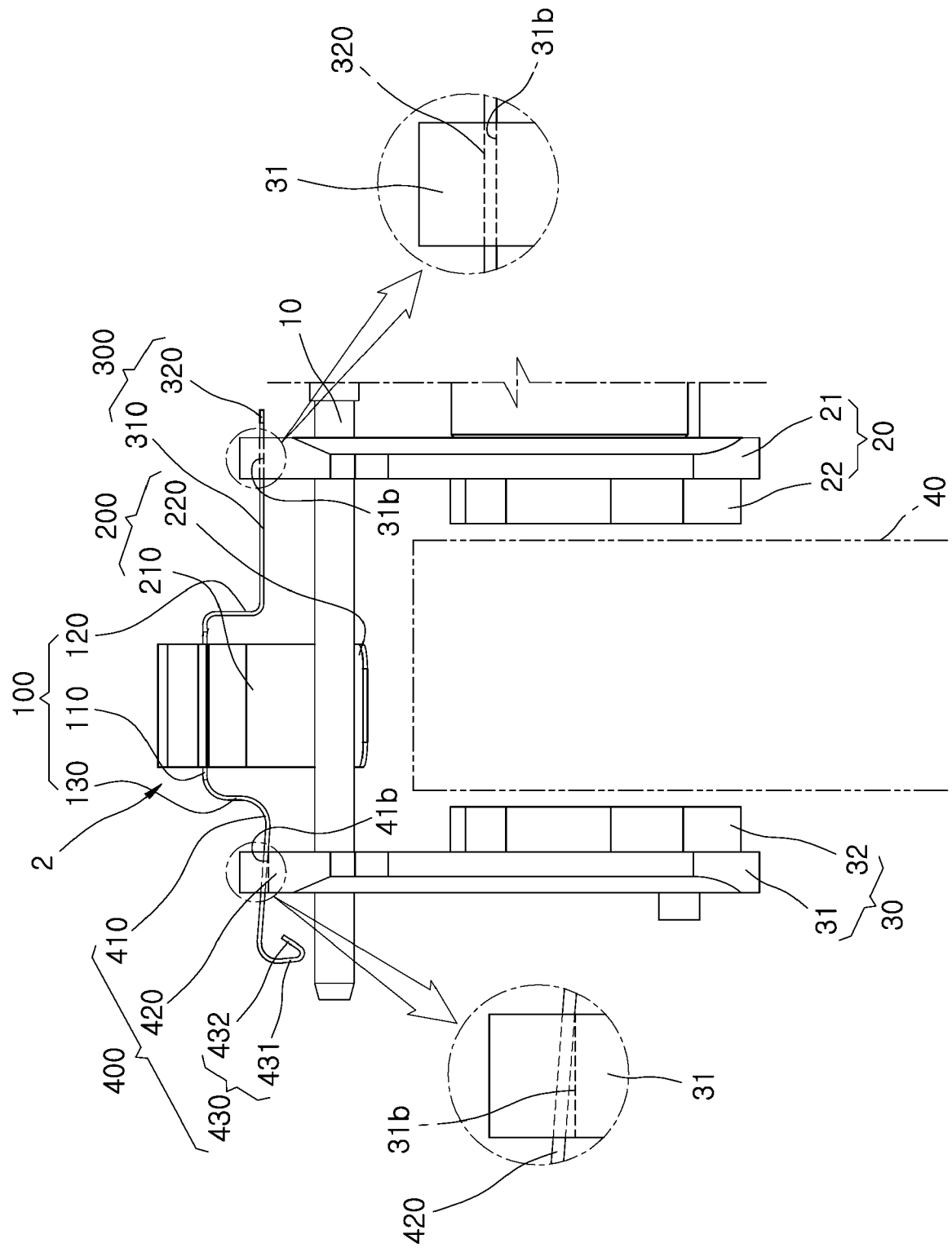
FIG. 6 is a side view of FIG. 4.
Figure 7:
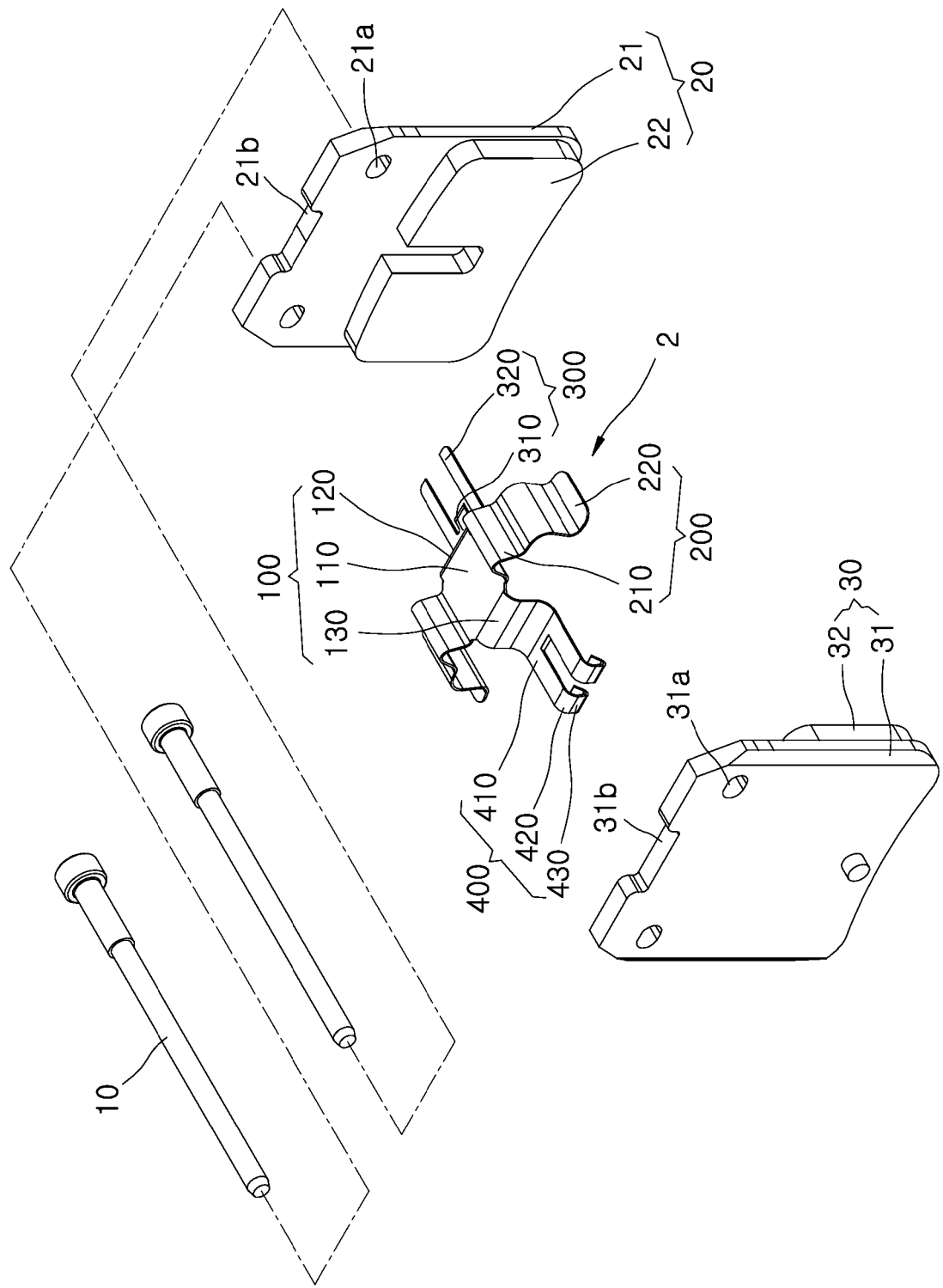
FIG. 7 is an exploded perspective view of the brake apparatus for a vehicle according to an embodiment of the present disclosure.
Figure 8:
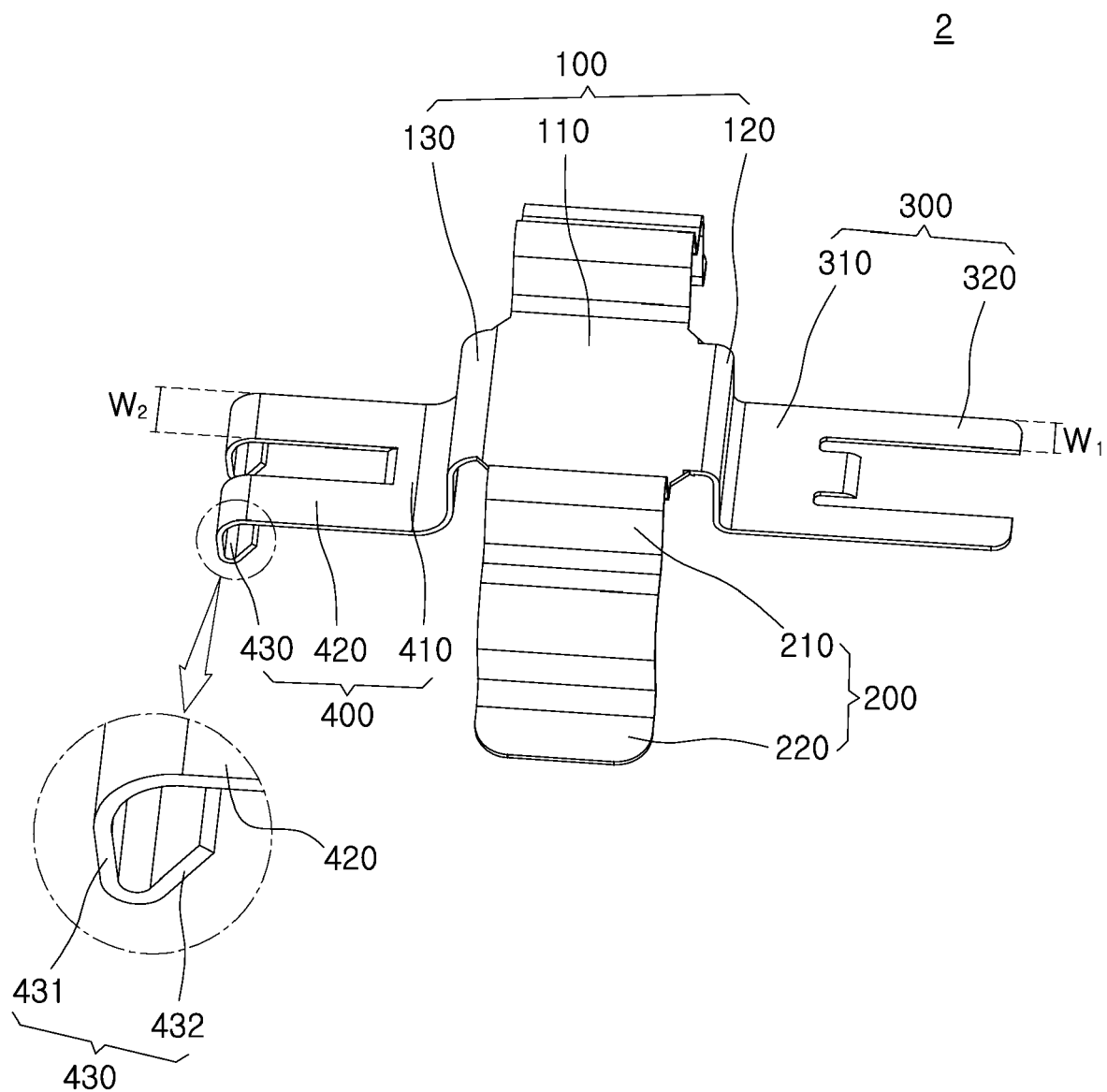
FIG. 8 is a perspective view of a pad liner for a brake apparatus according to an embodiment of the present disclosure.
Figure 9:
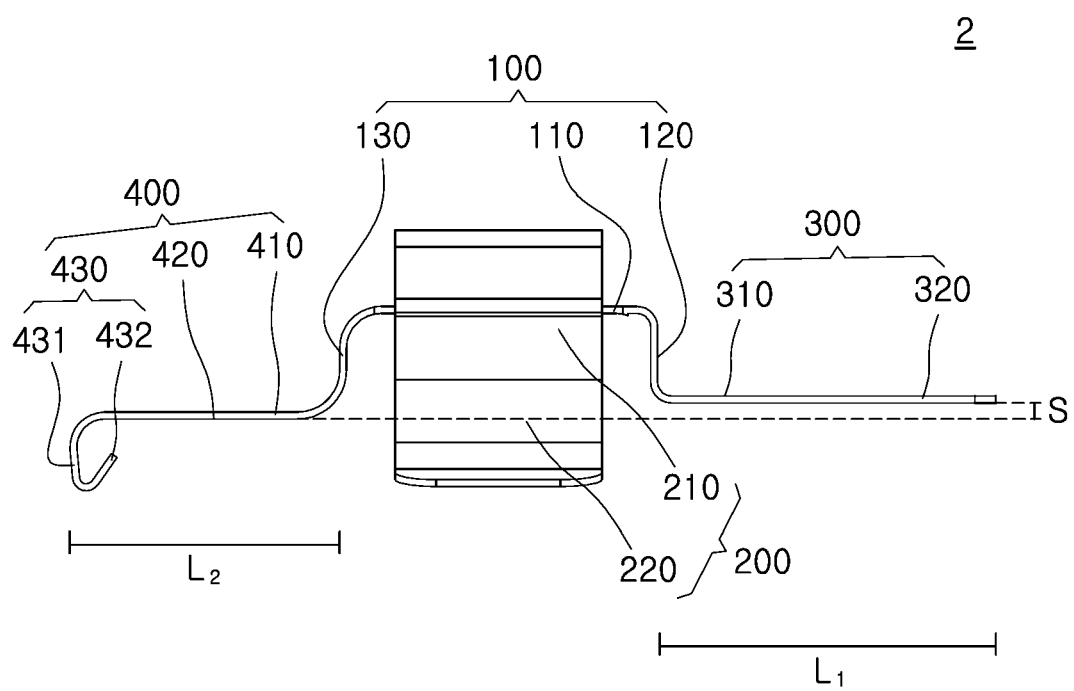
FIG. 9 is a side view of the pad liner for a brake apparatus according to an embodiment of the present disclosure.
Figure 10A:
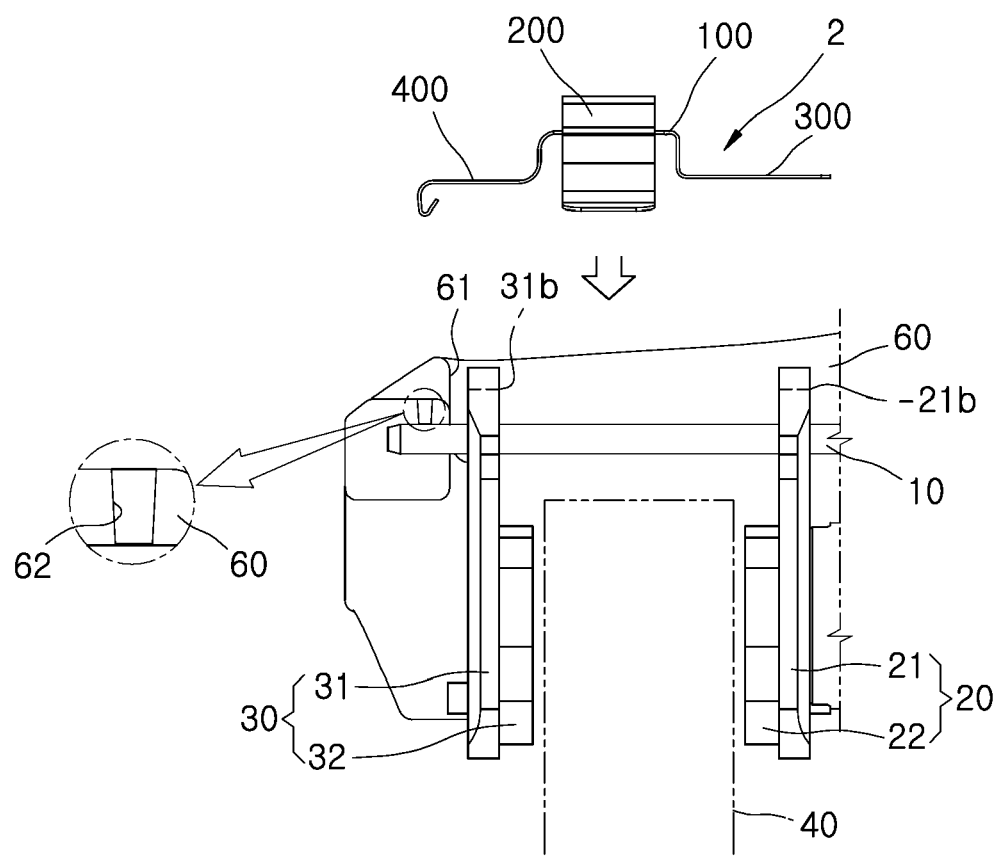
FIGS. 10A to 10B are a diagram illustrating a process of the pad liner for a brake apparatus of the brake apparatus for a vehicle according to an embodiment of the present disclosure being mounted on a pin member.
Figure 10B:
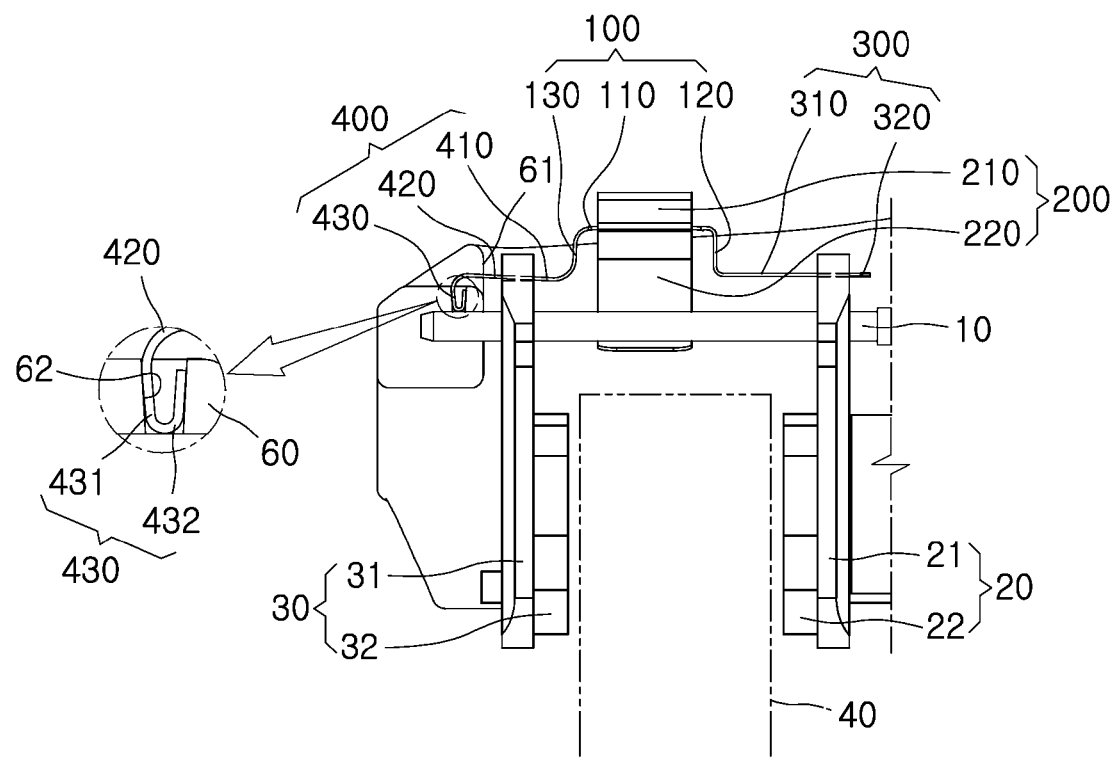
Figure 11:
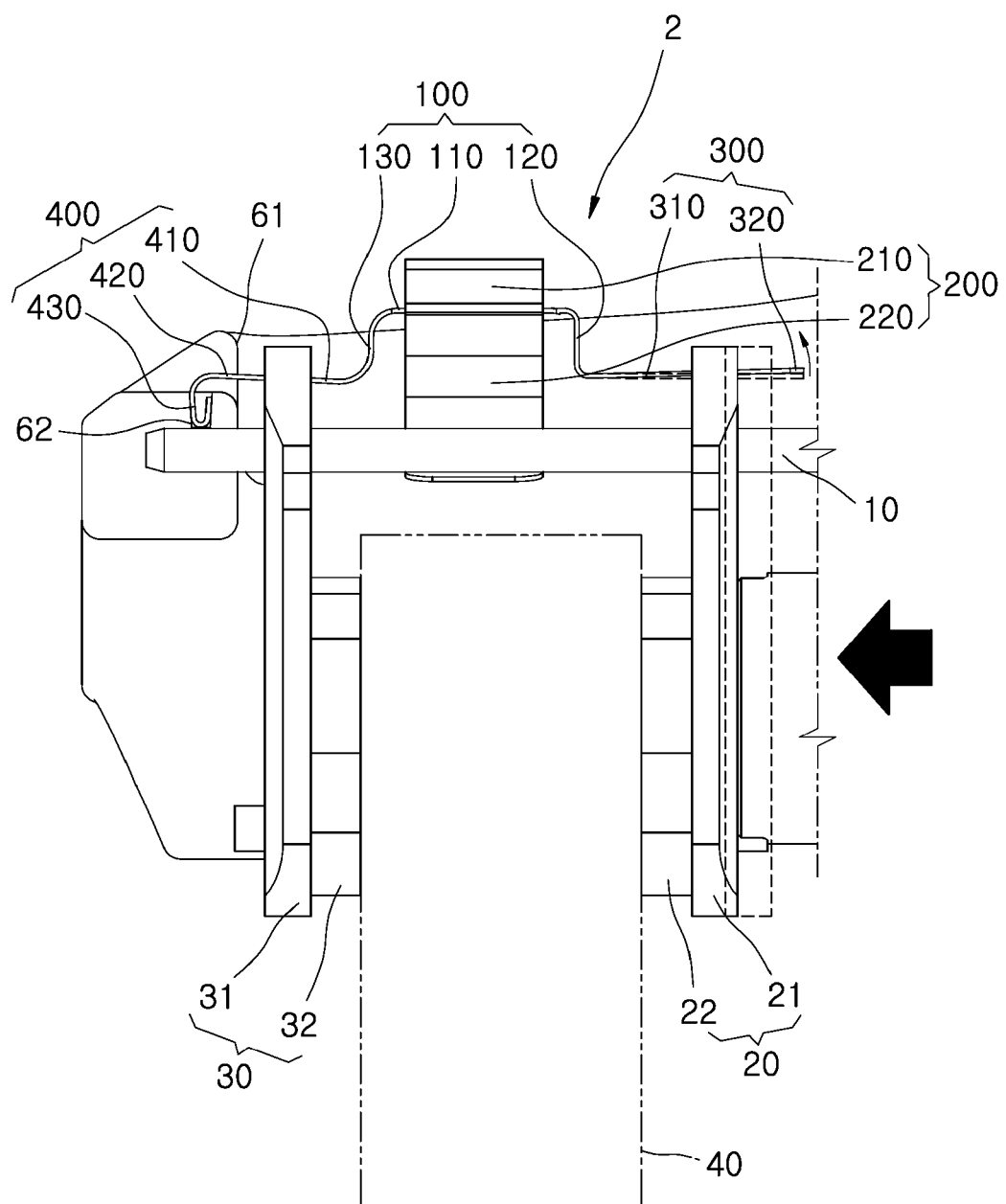
FIG. 11 is a diagram illustrating the state in which a first brake pad and a second brake pad come into contact with a brake disk according to an operation of a pressurization part of the brake apparatus for a vehicle according to an embodiment of the present disclosure.

FIG. 1 is a perspective view of a brake apparatus for a vehicle according to an embodiment of the present disclosure. FIG. 2 is an enlarged view of FIG. 1. FIG. 3 is a cross-sectional view of FIG. 1. FIG. 4 is a perspective view of major parts of the brake apparatus for a vehicle according to an embodiment of the present disclosure. FIG. 5 is an enlarged view of FIG. 4. FIG. 6 is a side view of FIG. 4. FIG. 7 is an exploded perspective view of the brake apparatus for a vehicle according to an embodiment of the present disclosure. FIG. 8 is a perspective view of a pad liner for a brake apparatus according to an embodiment of the present disclosure. FIG. 9 is a side view of the pad liner for a brake apparatus according to an embodiment of the present disclosure. FIGS. 10A to 10B are a diagram illustrating a process of the pad liner for a brake apparatus of the brake apparatus for a vehicle according to an embodiment of the present disclosure being mounted on a pin member. FIG. 11 is a diagram illustrating the state in which a first brake pad and a second brake pad come into contact with a brake disk according to an operation of a pressurization part of the brake apparatus for a vehicle according to an embodiment of the present disclosure.

Referring to FIGS. 1 to 11, a brake apparatus 1 for a vehicle according to an embodiment of the present disclosure includes a pair of pin members 10, a first brake pad 20, a second brake pad 30, a brake disk 40, a pressurization part 50, and a pad liner 2 for a brake apparatus.

The pad liner 2 for a brake apparatus according to an embodiment of the present disclosure includes a pad liner body 100, a pair of pad liner supports 200, a pad liner return part 300, and a pad liner extension part 400.

The pad liner body 100 is disposed between the pair of pin members 10. The pair of pin members 10 is installed in a caliper body 60 in a way to be spaced apart from each other. An installation hole part 61 disposed up and down (on the basis of FIG. 1) is formed at a central portion of the caliper body 60. The pair of pin members 10 is installed in the installation hole part 61 in a way to be spaced apart from each other.

The pad liner body 100 is disposed between the pair of pin members 10. The pair of pin members 10 is installed in the caliper body 60 in a way to be spaced apart from each other. An installation part (not illustrated) having a hole part shape and disposed up and down (on the basis of FIG. 1) is formed at a central portion of the caliper body 60. The pair of pin members 10 is installed in the installation part in a way to be spaced apart from each other.

The pad liner body 100 includes a first pad liner body 110, a second pad liner body 120, and a third pad liner body 130.

The first pad liner body 110 is disposed between the pair of pin members 10.

The second pad liner body 120 is bent and extended from the first pad liner body 110 to one side thereof. In this case, the second pad liner body 120 is bent and extended downward (on the basis of FIGS. 2 and 4) from the first pad liner body 110.

The third pad liner body 130 is bent and extended from the first pad liner body 110 to the other side thereof. In this case, the third pad liner body 130 is bent and extended downward (on the basis of FIGS. 2 and 4) from the first pad liner body 110.

The pair of pad liner supports 200 is extended and formed from both ends of the pad liner body 100, respectively, and supports the pair of pin members 10, respectively.

Specifically, the pair of pad liner supports 200 is extended and formed from both ends of the first pad liner body 110 of the pad liner body 100 so that the pair of pad liner supports 200 is disposed under the pair of pin members 10 (on the basis of FIGS. 2 and 4), respectively, and supports the pair of pin members 10, respectively. Accordingly, rattle noise can be effectively prevented because a movement of the pad liner 2 for a brake apparatus on the pair of pin members 10 is limited.

The pair of pad liner supports 200 includes a pair of first pad liner supports 210 and a pair of second pad liner supports 220.

The pair of first pad liner supports 210 is bent and extended from both ends of the first pad liner body 110 of the pad liner body 100 to the pair of pin members 10, respectively.

The pair of second pad liner supports 220 is bent and extended from the pair of first pad liner supports 210, respectively, and supports the pair of pin members 10, respectively. Specifically, the pair of second pad liner supports 220 is disposed under (on the basis of FIGS. 2 and 5) the pair of pin members 10, and supports the bottoms (on the basis of FIGS. 2 and 5) of the pair of pin members 10.

The pair of second pad liner supports 220 is bent and extended from the pair of first pad liner supports 210 to the pair of pin members 10, respectively, and comes into contact with the pair of pin members 10, respectively.

The pair of second pad liner supports 220 comes into contact with the bottoms (on the basis of FIGS. 3 and 9 to 11) of the pair of pin members 10. Accordingly, the pad liner 2 for a brake apparatus can be stably mounted on the pin members 10.

The pad liner return part 300 is connected to the pad liner body 100, and it pressurizes or presses the first brake pad 20, comes into contact with the first brake pad 20, and returns the first brake pad 20 to its original state by providing an elastic restoring force upon release of braking.

The pad liner return part 300 assigns weight to the first brake pad 20 by coming into contact with the first brake pad 20 and limits that the first brake pad 20 upward moves by pressurizing the first brake pad 20, so that rattle noise can be effectively prevented from occurring.

In this case, the pad liner return part 300 can prevent drag torque from occurring by pressurizing the first brake pad 20 within a range in which the first brake pad 20 moves, that is, slides.

The pad liner return part 300 is extended and formed from the second pad liner body 120 of the pad liner body 100 to the first brake pad 20, and comes into contact with the first back plate 21 of the first brake pad 20.

The pad liner return part 300 is elastically deformed by the first brake pad 20 that moves toward the brake disk 40 through the pressurization part 50 upon braking, and provides an elastic restoring force to the first brake pad 20 upon release of braking.

In this case, the pressurization part 50 is mounted on the caliper body 60, and is an element including a motor module part (not illustrated), a screw bar (not illustrated), a nut part (not illustrated), and a piston part (not illustrated). The pressurization part 50 may be variously changed within a range in which the pressurization part 50 pressurizes (or presses) the first brake pad 20.

The pad liner return part 300 includes a first pad liner return part 310 and a pair of second pad liner return parts 320.

The first pad liner return part 310 is extended and formed from the pad liner body 100 to one side thereof, and is disposed on a side higher than the pad liner extension part 400 described later.

The pair of second pad liner return parts 320 is spaced apart from each other and is extended and formed from the first pad liner return part 310 to one side thereof. The pair of second pad liner return parts 320 comes into contact with the first brake pad 20 and pressurizes the first brake pad 20. The pair of the second pad liner return part 320 comes into contact with the first back plate 21 of the first brake pad 20, and pressurizes the first back plate 21.

Specifically, the first brake pad 20 includes the first back plate 21 and a first friction member 22. The first brake pad 20 is disposed on one side of the brake disk 40 in a way to be movable in the pair of pin members 10. A pair of first penetration hole parts 21a through which the pair of pin members 10 penetrates, respectively, is formed in the first back plate 21.

Accordingly, the first brake pad 20 can be easily coupled on the pair of pin members 10, and can also move along the pair of pin members 10.

The first friction member 22 is coupled with the first back plate 21, and comes into contact with the brake disk 40. The first friction member 22 may be formed by using an elastic material, and comes into contact with one side of the brake disk 40. The first friction member 22 is coupled with the first back plate 21 in a way to face one side of the brake disk 40.

The pair of second pad liner return parts 320 is spaced apart from each other and is horizontally extended and formed from the first pad liner return part 310. The pair of second pad liner return parts 320 is inserted into a first installation groove part 21b of the first back plate 21, and comes into contact with the first back plate 21. In this case, the first pad liner return part 310 may be elastically deformed and inclined at a given or predetermined angle when coming into contact with the first back plate 21.

The pad liner extension part 400 is connected to the pad liner body 100, comes into contact with the second brake pad 30, and pressurizes the second brake pad 30. The pad liner extension part 400 is disposed on a side lower than the pad liner return part 300. The pad liner extension part 400 is disposed on the side lower than the pad liner return part 300 by a set interval S. Accordingly, the location of the second brake pad 30 can be further fixed because a pressurization force that the pad liner extension part 400 pressurizes the second brake pad 30 is increased.

A length L1 of the pad liner return part 300 is greater than a length L2 of the pad liner extension part 400 (refer to FIGS. 8 and 9). The length of the pad liner return part 300 is 8 mm or more to 10 mm or less greater than the length of the pad liner extension part 400. For example, when the length of the pad liner return part 300 is 18 mm or 20 mm, the length of the pad liner extension part 400 may be 10 mm. Accordingly, the first brake pad 20 can smoothly move, that is, slide, and a fixing force of the second brake pad 30 can be improved.

The pad liner extension part 400 includes a first pad liner extension part 410 and a pair of second pad liner extension parts 420. The first pad liner extension part 410 is extended and formed from the pad liner body 100 to the other side thereof, and is disposed on a side lower than the first pad liner return part 310. In this case, the first pad liner extension part 410 is extended and formed the third pad liner body 130 of the pad liner body 100 to the other side thereof.

The pair of second pad liner extension parts 420 is spaced apart from each other, and is extended and formed from the first pad liner extension part 410 to the other side thereof. The pair of second pad liner extension parts 420 comes into contact with the second brake pad 30 and pressurizes the second brake pad 30.

The pair of second pad liner extension parts 420 comes into contact with a second back plate 31 of the second brake pad 30, and pressurize the second back plate 31. The pair of second pad liner extension parts 420 is disposed on a side lower than the second pad liner return part 320.

Specifically, the second brake pad 30 includes the second back plate 31 and a second friction member 32. The second back plate 31 is coupled with the pair of pin members 10, and is disposed on the other side of the brake disk 40.

A pair of second penetration hole parts 31a through which the pair of pin members 10 penetrates, respectively, is formed in the second back plate 31 (refer to FIG. 7). Accordingly, the second brake pad 30 can be easily coupled on the pair of pin members 10.

The second friction member 32 is coupled with the second back plate 31, and comes into contact with the brake disk 40. The second friction member 32 may be formed by using an elastic material, and comes into contact with the other side of the brake disk 40. The second friction member 32 is coupled with the second back plate 31 in a way to face the other side of the brake disk 40.

The pair of second pad liner extension parts 420 is spaced apart from each other and is horizontally extended and formed from the first pad liner extension part 410. The pair of second pad liner extension parts 420 is inserted into a second installation groove part 31b of the second back plate 31, and comes into contact with the second back plate 31.

The pad liner extension part 400 is elastically deformed and inclined at a given or predetermined angle when coming into contact with the second back plate 31. In this case, the pad liner extension part 400 is disposed on a side lower than the pad liner return part 300. Accordingly, the pad liner extension part 400 can pressurize the second back plate 31 by further assigning weight to the second back plate 31.

A width W2 of the second pad liner extension part 420 is greater than a width W1 of the second pad liner return part 320 (refer to FIGS. 8 and 9). The width W2 of the second pad liner extension part 420 may be 0.5 mm or more to 1 mm or less greater than the width W1 of the second pad liner return part 320. For example, when the width of the second pad liner return part 320 is 6.5 mm, the width of the second pad liner extension part 420 may be 7 mm or 8 mm.

Accordingly, a pressurization force that the second pad liner extension part 420 pressurizes the second brake pad 30 may be greater than a pressurization force that the first pad liner extension part 410 pressurizes the first brake pad 20. As a result, the second brake pad 30 can be firmly fixed at its set location.

A pad liner coupling part 430 is bent and extended from the second pad liner extension part 420 to the caliper body 60 and is fit into a coupling groove part 62 of the caliper body 60 by an elastic force thereof. Specifically, the pad liner coupling part 430 is elastically deformed in a V shape and insert into the coupling groove part 62. Thereafter, the pad liner coupling part 430 is restored to its original state by an elastic force thereof and fit into the coupling groove part 62.

The coupling groove part 62 has a width W gradually reduced proportionally to a distance from a surface of the caliper body 60. Accordingly, the pad liner coupling part 430 can be easily inserted into the coupling groove part 62 when inserted into the coupling groove part 62, and can be firmly fit into the coupling groove part 62 while restoring to its original state by an elastic force thereof.

The pad liner coupling part 430 includes a first pad liner coupling part 431 and a second pad liner coupling part 432. The first pad liner coupling part 431 is bent and extended from the second pad liner extension part 420 to the caliper body 60. The second pad liner coupling part 432 is bent and extended from the first pad liner coupling part 431 in a way to face the first pad liner coupling part 431.

Hereinafter, an operation and effects of the pad liner 2 for a brake apparatus according to an embodiment of the present disclosure are described with reference to FIG. 11.

When a driver manipulates a brake pedal (not illustrated), the pressurization part 50 pressurizes the first brake pad 20 toward the brake disk 40 (refer to FIG. 11). Accordingly, as the first brake pad 20 and the second brake pad 30 are rubbed against the brake disk 40, braking power occurs.

At this time, a state of the second pad liner return part 320 of the pad liner return part 300 is the state in which the second pad liner return part 320 has pressurized the first brake pad 20. The first brake pad 20 is moved toward the brake disk 40 and closely attached to the brake disk 40. A state of the second pad liner extension part 420 of the pad liner extension part 400 is the state in which the second pad liner extension part 420 has pressurized the second brake pad 30. At this time, the location of the second brake pad 30 is fixed, which prevents the second brake pad 30 from moving.

Contrariwise, when the braking is released, the pressurization part 50 is spaced apart from the first brake pad 20, and an elastic restoring force of the second pad liner return part 320 of the pad liner return part 300 restores the first brake pad 20 to its original state so that the first brake pad 20 is sufficiently spaced from the brake disk 40. Accordingly, the first brake pad 20 and the second brake pad 30 are spaced apart from each other on the left and right (on the basis of FIG. 11) of the brake disk 40. At this time, as the first brake pad 20 and the second brake pad 30 are sufficiently spaced apart from the brake disk 40, a drag phenomenon attributable to contacts between the first brake pad 20 and the brake disk 40 and between the second brake pad 30 and the brake disk 40 can be prevented. Furthermore, the occurrence of rattle noise can be prevented.

At this time, a state of the second pad liner return part 320 of the pad liner return part 300 is the state in which the second pad liner return part 320 has pressurized the first brake pad 20. The first brake pad 20 is moved to a side opposite to the brake disk 40 by the released of the pressurization of the pressurization part 50, and is spaced apart from the brake disk 40. A state of the second pad liner extension part 420 of the pad liner extension part 400 is the state in which the second pad liner extension part 420 has pressurized the second brake pad 30. At this time, the location of the second brake pad 30 is fixed, which prevents the second brake pad 30 from moving.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments.

Accordingly, the true technical range of protection of the present disclosure should be determined by the technical spirit of the claims.

What is claimed is:

1. A pad liner for a brake apparatus, comprising:
   a pad liner body disposed between a pair of pin members;
   a pair of pad liner supports respectively extending from both ends of the pad liner body and configured to respectively support the pair of pin members;
   a pad liner return part connected to the pad liner body and configured to (1) contact and press a first brake pad when a braking occurs and (2) provide an elastic restoring force to the first brake pad when the braking is released and the first brake pad is restored to an initial state;
   a pad liner extension part connected to the pad liner body, positioned lower than the pad liner return part, and configured to contact and press a second brake pad,
   wherein the pad liner return part comprises:
     a first pad liner return part extending from the pad liner body and positioned higher than the pad liner extension part; and
     a pair of second pad liner return parts spaced apart from each other, extending from the first pad liner return part and configured to contact and press the first brake pad.

2. The pad liner of claim 1, wherein the pad liner return part is longer than the pad liner extension part.

3. The pad liner of claim 1, wherein the first pad liner return part is configured to be elastically deformed and inclined at an angle when contacting a first back plate of the first brake pad.

4. The pad liner of claim 1, wherein the pad liner extension part comprises:
   a first pad liner extension part extending from the pad liner body and positioned lower than the first pad liner return part; and
   a pair of second pad liner extension parts spaced apart from each other, extending from the first pad liner extension part and configured to contact and press the second brake pad.

5. The pad liner of claim 4, wherein the pad liner extension part is configured to be elastically deformed and inclined at an angle when contacting a second back plate of the second brake pad.

6. The pad liner of claim 4, wherein the second pad liner extension part is wider than the second pad liner return part.

7. The pad liner of claim 4, further comprising a pad liner coupling part that is bent, extending from the second pad liner extension part to a caliper body, and disposed at a coupling groove part of the caliper body.

8. The pad liner of claim 7, wherein the coupling groove part is gradually narrowed proportionally to a distance from a surface of the caliper body.

9. The pad liner of claim 7, wherein the pad liner coupling part comprises:
- a first pad liner coupling part that is bent and extending from the second pad liner extension part to the caliper body; and
- a second pad liner coupling part that is bent, extending from the first pad liner coupling part and facing the first pad liner coupling part.

* * * * *